No. 815,883. PATENTED MAR. 20, 1906.
S. M. VAN BLARCOM.
CONDIMENT HOLDER.
APPLICATION FILED OCT. 4, 1905.

WITNESSES:
William Miller
George Hulsberg

INVENTOR
Samuel M. Van Blarcom
BY W. C. Hauff
ATTORNEY

UNITED STATES PATENT OFFICE.

SAMUEL M. VAN BLARCOM, OF NEW YORK, N. Y.

CONDIMENT-HOLDER.

No. 815,883.  Specification of Letters Patent.  Patented March 20, 1906.

Application filed October 4, 1905. Serial No. 281,296.

*To all whom it may concern:*

Be it known that I, SAMUEL M. VAN BLARCOM, a citizen of the United States, residing at Manhattan borough, in the city of New York, county of New York, and State of New York, have invented new and useful Improvements in Condiment-Holders, of which the following is a specification.

This invention relates to a device adapted, among other purposes, for keeping salt in granular or suitable condition to be shaken or applied, as required.

This invention is set forth in the following specification and claims and illustrated in the annexed drawings, in which—

Figure 1:
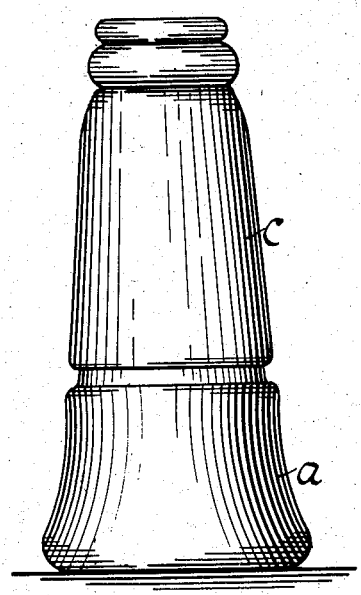
Figure 2:
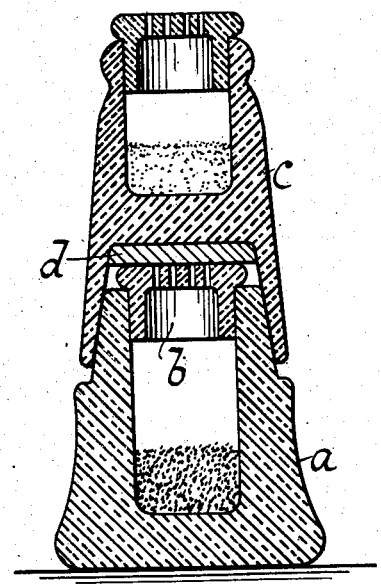
Figure 3:
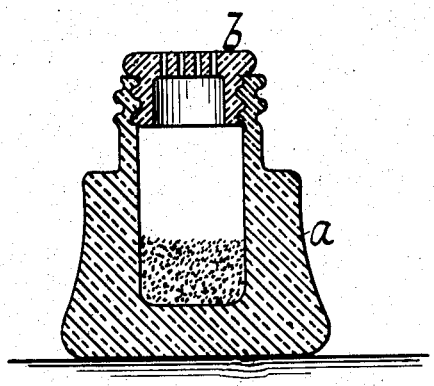
Figure 4:
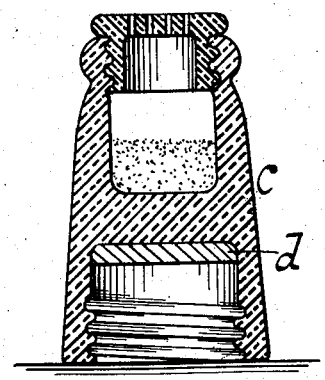

Figure 1 is an elevation of an article embodying this invention. Fig. 2 is a section of Fig. 1. Figs. 3 and 4 show modifications.

The salt-shakers usually employed have the disadvantage that in moist weather the atmosphere entering through the perforations of the lid or cover causes the salt to cake or lump, and no more salt can be shaken out. In this device the salt-shaker $a$ has its perforated cap or lid $b$ covered by the removable pepper-shaker $c$. The pepper-shaker $c$ acts as a cover for the mouth of the salt-shaker $a$, and at the same time this top or covering shaker $c$ can be readily taken off and salt shaken out of vessel $a$. This covering vessel $a$ when in place prevents moisture from entering the perforations of cap or lid $b$.

The top shaker $c$ can be made to secure a tight fit over the mouth part of the salt-shaker $a$, and a packing or washer $d$ is suitably applied to prevent salt shaking into the hollow or recessed bottom of the pepper-shaker when the latter is used without having been dismounted or taken off from the lower receptacle.

The device can be made of suitable shape, size, or materials.

The perforated caps can be inserted into place, as seen in Fig. 2, or screwed into place, as seen in Fig. 3.

The condiment-holder $c$, nesting the salt-shaker, can either be slipped into place, Fig. 2, or a threaded or screw connection can be employed, as seen in Figs. 3 and 4, or other suitable joint be employed. One of the receptacles is thus suitably made to serve as a moisture-guard for the other. The upper or exposed vessel could of course be provided with a condiment or contents which do not clog or lump or become affected by atmospheric influence.

What I claim as my invention, and desire to secure by Letters Patent, is—

1. A damp-proof salt-shaker having a perforated top and a condiment-holder having a recessed bottom adapted to sit over and releasably engage the neck or upper portion of said shaker and form a cap for closing the same.

2. A damp-proof salt-shaker and condiment-holder, said holder being made to cover or nest the shaker, and being provided at its bottom with a washer or the like to cover the salt-shaker and prevent salt from escaping or being shaken out while the holder is in place.

3. A salt-shaker having a perforated top and combined with a condiment-holder having a bottom portion formed to receive said top snugly and to close the perforations thereof.

4. A salt-shaker having a perforated top and combined with a condiment-holder having a bottom portion formed to receive said top snugly and to rest upon the upper surface thereof and thereby close the perforations therein.

In testimony whereof I have hereunto set my hand in the presence of two subscribing witnesses.

SAMUEL M. VAN BLARCOM.

Witnesses:
EDWARD WIESNER,
GEORGE HULSBERG.